US008631016B2

(12) United States Patent
Gudlavenkatasiva et al.

(10) Patent No.: US 8,631,016 B2
(45) Date of Patent: Jan. 14, 2014

(54) TELEPHONE NUMBERS WITH ALPHABETIC PATTERNS

(75) Inventors: Bhaskar R. Gudlavenkatasiva, Tampa, FL (US); Maria Sanchez, Hicksville, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 315 days.

(21) Appl. No.: 12/825,914

(22) Filed: Jun. 29, 2010

(65) Prior Publication Data

US 2011/0320448 A1 Dec. 29, 2011

(51) Int. Cl.
*G06F 17/30* (2006.01)
*H04M 1/56* (2006.01)

(52) U.S. Cl.
USPC ........... 707/748; 707/661; 707/737; 707/944; 705/26.1; 705/26.3; 379/142.09; 379/457

(58) Field of Classification Search
USPC ............................................. 379/142.09, 457
See application file for complete search history.

(56) References Cited

U.S. PATENT DOCUMENTS

| 4,800,582 | A * | 1/1989 | D'Agosto et al. | ....... 379/216.01 |
| 6,253,328 | B1 * | 6/2001 | Smith, Jr. | ........................ 726/18 |
| 2004/0201502 | A1 * | 10/2004 | Wong | .............................. 341/22 |
| 2006/0123338 | A1 * | 6/2006 | McCaffrey et al. | ............ 715/531 |
| 2009/0287533 | A1 * | 11/2009 | Swamynathan et al. | ........ 705/10 |
| 2010/0169595 | A1 * | 7/2010 | Bryant-Rich | ................. 711/162 |
| 2010/0239084 | A1 * | 9/2010 | Brown et al. | ............ 379/218.01 |

OTHER PUBLICATIONS

Nuru, LLC, "Frequently Asked Questions About PhoneSpell," http://www.phonespell.org/faqT.html and http://www.phonespell.org/faqC.html, Mar. 16th and Mar. 22nd respectively (National Archive Wayback machine dates).*
Nuru, LLC, "Frequently Asked Questions About PhoneSpell," http://www.phonespell.org/faqT.html and http://www.phonespell.org/faqC.html, Mar. 16 and Mar. 22 respectively (National Archive Wayback machine dates).*

* cited by examiner

*Primary Examiner* — Sangwoo Ahn

(57) ABSTRACT

An exemplary process includes storing telephone numbers in a telephone number database, identifying which telephone numbers in the telephone number database have digits that occur in an alphabetic pattern as defined by a reference list, and designating the telephone numbers with digits occurring in the alphabetic pattern as patterned telephone numbers. An exemplary process of identifying alphabetic patterns includes assigning at least one letter in an alphabet to a first digit, assigning at least one other letter in an alphabet to a second digit, accessing a telephone number database storing telephone numbers having a plurality of digits, identifying a letter combination created by at least two digits of at least one of the telephone numbers in the telephone number database, and determining whether the letter combination forms an alphabetic pattern as defined by a reference list.

19 Claims, 3 Drawing Sheets

TELEPHONE NUMBERS WITH ALPHABETIC PATTERNS

BACKGROUND

Telecommunications carriers assign telephone numbers to subscribers. Some subscribers are willing to pay a premium for "gold" telephone numbers, i.e., telephone numbers that are easy to remember. Carriers identify "gold" telephone numbers based on numeric patterns. For example, one carrier might identify the telephone number "555-5555" as a "gold" telephone number because each digit in the telephone number is the same.

By focusing only on numeric patterns, however, carriers limit the number of "gold" telephone numbers that may be sold to subscribers. If a carrier were able to identify additional "gold" telephone numbers, the carrier could sell more telephone numbers at a premium, resulting in increased revenue for the carrier. Accordingly, a new way of identifying additional "gold" telephone numbers is needed.

DETAILED DESCRIPTION

An exemplary process includes storing telephone numbers in a telephone number database, identifying which telephone numbers in the telephone number database have digits that occur in an alphabetic pattern as defined by a reference list, and designating the telephone numbers with digits occurring in the alphabetic pattern as patterned telephone numbers. As used herein, alphabetic patterns include any pattern formed by letters alone or letters in combination with numbers. Thus, the words in the reference list may include words formed from letters or combinations of letters and numbers. By designating telephone numbers with alphabetic patterns as patterned telephone numbers in addition to telephone numbers with numeric patterns, carriers can sell more telephone numbers at a premium to subscribers.

An exemplary process of identifying alphabetic patterns includes assigning letters in an alphabet to digits, accessing telephone numbers stored in a telephone number database, identifying a letter combination created by at least two digits of the telephone numbers in the telephone number database, and determining whether the letter combination forms an alphabetic pattern. The alphabetic pattern may include any combination of letters that makes the telephone number more memorable. With reference to the last four digits of a telephone number, exemplary words defined by the reference list that form alphabetic patterns include repeated letters (e.g., "abab"), groups of double letters (e.g., "aadd"), sequential ascending letters as defined by an alphabet (e.g., "abed"), sequential descending letters as defined by an alphabet (e.g., "dcba"), at least three occurrences of the same letter in a row (e.g., "aaac"), repetitive combinations of letters (e.g., "baba"), mirrored letters (e.g., "adda"), etc. within a single telephone number and identify such occurrences as an alphabetic pattern. Moreover, the reference list may define the alphabetic pattern to include words found in a dictionary, a thesaurus, a list of names or other proper nouns, a list of abbreviations, a list of slang terms, a list of Internet vernacular terms (e.g., "leet speak"), etc. Therefore, the system may be further configured to identify telephone numbers with digits that spell words like "JAWS," "NYNY," "JANE," "ROFL," and "GR8T" as "gold" telephone numbers. While words with four letters are used in the examples above, the words may be formed from any number of digits up to the total number of digits in a telephone number, including the digits that make up the country code, area code, exchange code, subscriber digits, and so on.

Figure 1:
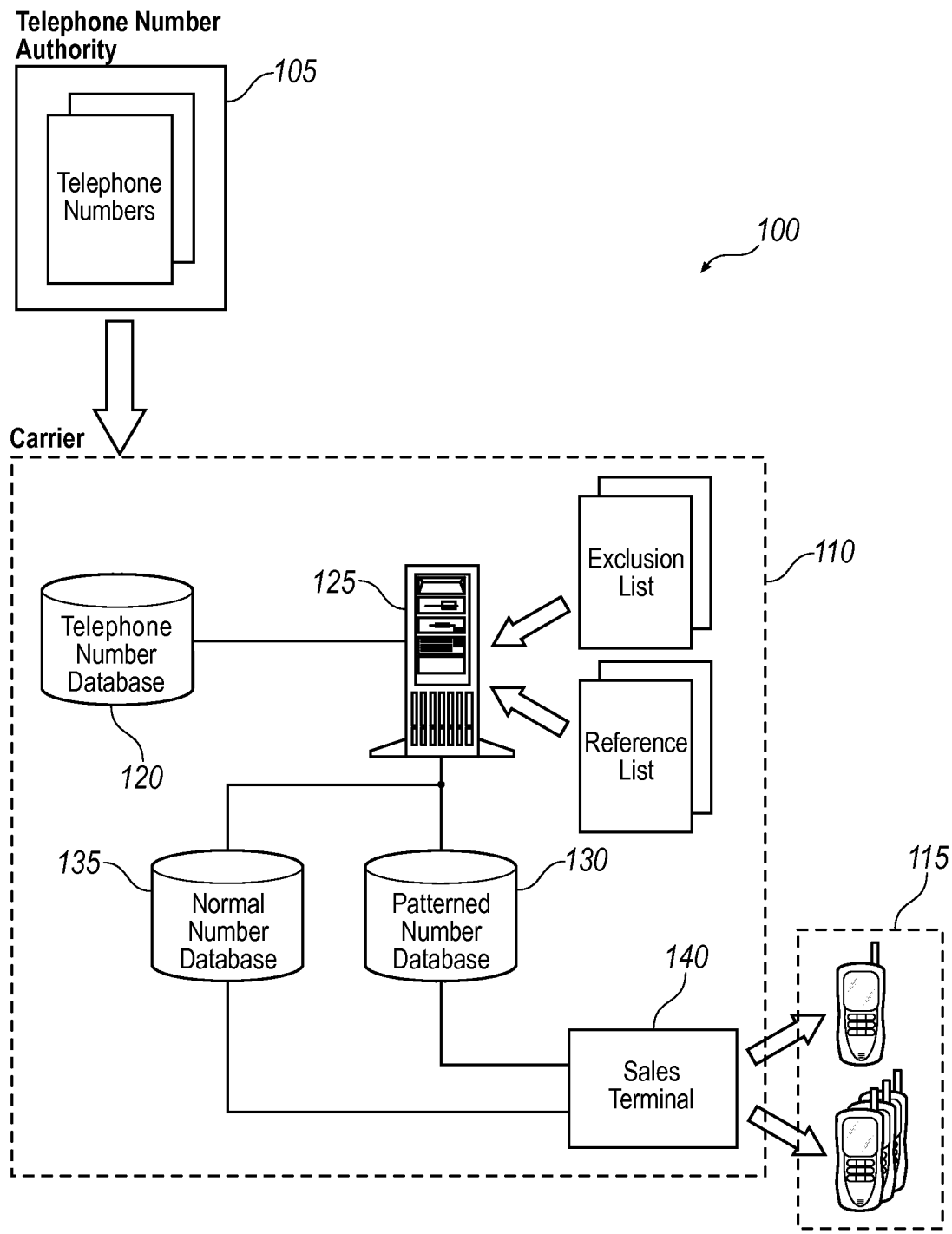
FIG. 1 illustrates an exemplary system for grouping telephone numbers with digits that occur in numeric and alphabetic patterns.

FIG. 1 illustrates an exemplary system 100 that is configured to identify alphabetic patterns formed from letters alone or a combination of letters and numbers in telephone numbers. The system 100 may take many different forms and include multiple and/or alternate components and facilities. While an exemplary system 100 is shown in FIG. 1, the exemplary components illustrated in FIG. 1 are not intended to be limiting. Indeed, additional or alternative components and/or implementations may be used.

As illustrated in FIG. 1, the system 100 includes a telephone number authority 105, a telecommunications carrier 110, and one or more subscribers 115. The carrier 110 receives available telephone numbers from the telephone number authority 105 and can assign available telephone numbers to its subscribers 115.

The telephone number authority 105 may include, for instance, a governing body that distributes unassigned telephone numbers to carriers 110 based on a protocol, such as the North American Numbering Plan. Under the North American Numbering Plan, telephone numbers in North America have a country code, a three-digit area code, a three-digit exchange code, and a four-digit subscriber number. The International Telecommunication Union (ITU) designates the country code. The area code is based on a geographic area in which the telephone number may be used, and the exchange code is based on the central office that services or assigns the telephone number. The subscriber number is a number that is unique to each subscriber having the same area code and exchange code. The North American Numbering Plan further designates which digits may be used for the area code, exchange code, and subscriber number.

The carrier 110 illustrated in FIG. 1 includes a telephone number database 120, a computing device 125, a patterned number database 130, a normal number database 135, and a sales terminal 140. The carrier 110 may include any entity that provides telecommunications services to subscribers 115. For example, the carrier 110 may include any local exchange carrier 110, wireless carrier 110, mobile network operator, Internet services provider, etc. In one particular approach, the carrier 110 receives unused telephone numbers from the telephone number authority 105 and assigns those telephone numbers to subscribers 115.

The telephone number database 120 may store the telephone numbers received from the telephone number authority 105 in a way that is accessible to the computing device 125. The computing device 125 may include any device configured to access the telephone numbers in the telephone number database 120 and identify which telephone numbers have an alphabetic pattern, a numeric pattern, or both. Once identified as having a pattern, the computing device 125 may be configured to designate the number as a patterned number and store the number in the patterned number database 130. Otherwise, the computing device 125 may be configured to leave the number in the telephone number database 120, or alternatively, store the number in the normal number database 135.

In one exemplary approach, the computing device 125 may be configured to identify whether a telephone number has a numeric pattern before determining whether the telephone number has an alphabetic pattern. For instance, the computing device 125 may be configured to search each number in the telephone number database 120 for numeric patterns. With reference to the last four digits of a telephone number, the numeric patterns may include repeated numbers (e.g., "1212"), groups of double numbers (e.g., "3344"), sequential ascending numbers (e.g., "1234"), sequential descending numbers (e.g., "4321"), at least three occurrences of the same number (e.g., "1113", repetitive combinations of numbers (e.g., "1212"), numbers ending with "00," "000," or "0000," mirrored numbers (e.g., "1441"), etc. that occur within a single telephone number. Once a telephone number is identified as having a numeric pattern, the computing device 125 may be configured to store that number in the patterned number database 130, which may remove the number with the numeric pattern from the telephone number database 120.

The computing device 125 may be configured to determine if the number has an alphabetic pattern, which may include letters alone or a combination of letters and numbers as defined by the reference list, and if so, designate the number as a patterned telephone number and store the patterned numbers in the patterned number database 130, thus removing the telephone number with the alphabetic patterns from the telephone number database 120. After the numbers with numeric and alphabetic patterns are removed from the telephone number database 120, the computing device 125 may designate any remaining numbers in the telephone number database 120 as normal numbers. The computing device 125 may store normal numbers in the normal number database 135. The telephone numbers may be stored in any number of databases or data stores. Although illustrated as separate databases, the telephone number database 120, the patterned number database 130, and the normal number database 135 may be part of the same database or may each be formed from multiple databases. In one exemplary approach, instead of storing different numbers in different databases, the computing device 125 may be configured to indicate that the number is a patterned number or normal number via an attribute in a field of the database in which the number is stored.

To identify which telephone numbers have digits that form an alphabetic pattern, the computing device 125 may be configured to associate one or more digits used with telephone numbers to a letter in an alphabet. In one exemplary implementation, the computing device 125 may use a standard such as the E.161 standard, which is an ITU-T standard that defines the assignment of the 26 letters in the English alphabet to the 12-key telephone keypad, or any other standard or heuristic to associate digits to letters.

The computing device 125 may be configured to identify alphabetic combinations created by at least two of the digits of the telephone number. For instance, the computing device 125 may identify alphabetic patterns based on letters alone or combinations of letters and numbers created by the digits in the area code, exchange code, subscriber number, or any combination thereof. Once the combinations have been identified, the computing device 125 may determine whether any of the letter combinations form an alphabetic pattern such as by searching the combinations for words indicated by the reference list as forming alphabetic patterns. For instance, the reference list may indicate that alphabetic patterns are formed by repeated letters, groups of double letters, sequential ascending letters as defined by an alphabet, sequential descending letters as defined by an alphabet, at least three occurrences of the same letter in a row, repetitive combinations of letters, mirrored letters, etc. that appear within a single telephone number.

Of course, the computing device 125 may identify other combinations of letters or letters and numbers as the alphabetic pattern based on the words identified in the reference list. For example, the reference list may indicate that words in a dictionary, a thesaurus, a list of names or other proper nouns, a list of abbreviations, a list of slang terms, a list of Internet vernacular terms (e.g., "leet speak"), etc. form the alphabetic pattern. Thus, the computing device 125 may be configured to determine whether the letter combination forms one or more words that appear in the reference list. To do so, the computing device 125 may be configured to compare the letter combinations in the telephone number to the words in the reference list and attempt to match the letter combination to those words. If a match exists, the computing device 125 may be configured to designate the telephone number as a patterned number.

When identifying words in the telephone numbers, the computing device 125 may be configured to interpret various numbers as letters. For instance, the number zero "0" may be interpreted as the letter "O" when identifying alphabetic patterns, and in particular, alphabetic patterns that include a combination of letters and numbers. Therefore, the computing device 125 may interpret the subscriber numbers "2005" as the word "BOOK" since the letter "B" is associated with the number two and the letter "K" is associated with the number five using the E.161 standard. While the letter "O" is associated with the number six in the E.161 standard, many users will recognize the number zero as a replacement for the letter "O." Accordingly, the carrier 110 could sell telephone numbers ending in "2005" and "2665" as the word "BOOK."

In one exemplary implementation, the computing device 125 may be configured to exclude any identified alphabetic patterns that appear in an exclusion list from being listed in the patterned number database 130. The exclusion list may be stored in a database or in the computing device 125 and include words that the carrier would like to exclude from being identified as alphabetic patterns. For instance, the exclusion list may include expletives, derogatory terms, pejorative terms, ethnic slurs, product names, and the like. Alternatively, the computing device 125 may be configured to remove the terms listed in the exclusion list from the reference list prior to identifying alphabetic patterns.

After the computing device 125 has had an opportunity to determine whether the numbers in the telephone number database 120 form numeric or alphabetic patterns, the telephone numbers received from the telephone number authority 105 become available to the sales terminal 140. The sales terminal 140 may be any device configured to query the telephone number database 120, the patterned number database 130, the normal number database 135, or any combination thereof, for telephone numbers available to subscribers 115. In one exemplary approach, the sales terminal 140 has a user interface that allows a sales person or subscriber 115 to query the patterned number database 130 for telephone numbers that have either a numeric or alphabetic pattern. The user interface may present the results of the query to the sales person or subscriber 115 and allow the subscriber 115 to select a patterned telephone number.

The computing device 125 may be configured to weigh each telephone number in the patterned number database 130 based on the number of numeric and alphabetic patterns contained in an individual telephone number. The weight of the telephone number may be used to determine its cost for a customer to purchase. For example, a telephone number with the subscriber digits "4788" has a numeric pattern as well as the alphabetic pattern "GR8T." Similarly, the subscriber digits "2665" have a numeric pattern with the repeating number six, but also spell the words "BOOK," "COOK," "COOL," etc. The computing device 125 is configured to weight these telephone numbers accordingly.

In general, computing systems and/or devices, such as the computing device 125 and the sales terminal 140, may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Examples of computing devices include, without limitation, a computer workstation, a server, a desktop, notebook, laptop, or handheld computer, or some other known computing system and/or device.

Computing devices generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein, such as the telephone number database 120, the patterned number database 130, and the normal number database 135, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 2:
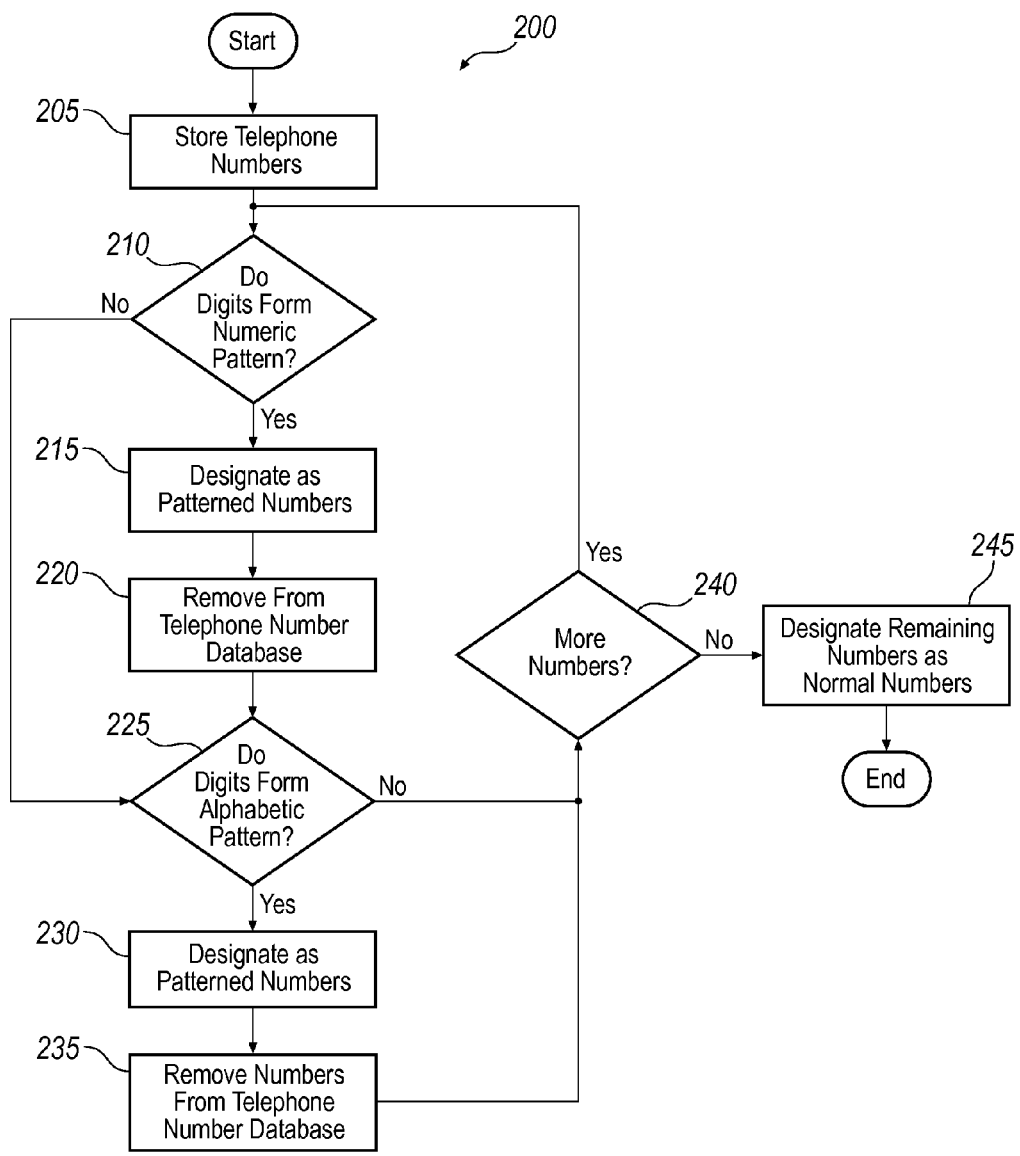
FIG. 2 illustrates an exemplary process of grouping telephone numbers with numeric and alphabetic patterns.

FIG. 2 is an exemplary process 200 that may be performed by the exemplary system 100 illustrated in FIG. 1. Of course, the process 200 is merely exemplary and the system 100 may perform other processes in addition to or instead of the process 200 as described herein.

Block 205 includes storing telephone numbers in the telephone number database 120. The carrier 110 may receive telephone numbers from the telephone number authority 105 and store the numbers received in the telephone number database 120. The telephone number database 120 is accessible to the computing device 125.

Decision block 210 includes determining whether the digits in one of the numbers in the telephone number database 120 form a numeric pattern. For example, the computing device 125 may be configured to search for numeric patterns in each of the telephone numbers in the telephone number database 120. In one exemplary approach, the numeric pattern may be based on any part of the telephone number, such as the last four digits (e.g., the subscriber number). Numeric patterns may include repeated numbers, groups of double numbers, sequential ascending numbers, sequential descending numbers, at least three occurrences of the same number, repetitive combinations of numbers, numbers ending with "00," "000," or "0000," mirrored numbers, etc. that occur within a single telephone number. If the telephone number includes a numeric pattern, the process 200 continues with block 215. If not, the process 200 continues with block 225.

Block 215 includes designating the telephone numbers with numeric patterns as patterned numbers. For example, the computing device 125 may make such designation after identifying the numeric pattern in the telephone number. Further, with the numeric pattern designation, telephone numbers with numeric patterns can be easily identified in queries for telephone numbers with numeric patterns performed using the sales terminal 140.

Block 220 includes removing the telephone numbers with numeric patterns from the telephone number database 120. In one exemplary implementation, once the computing device 125 has designated the telephone numbers with numeric patterns as patterned numbers, there may be no need to further determine whether those telephone numbers have an alphabetic pattern. Therefore, the telephone numbers with numeric patterns are removed from the telephone number database 120 and may be stored in the patterned number database 130. Alternatively, there may be some benefit to identifying telephone numbers with both numeric and alphabetic patterns such as for determining which telephone numbers have a higher value to customers (e.g., telephone numbers with multiple patterns may be deemed to have a higher value). Therefore, the telephone numbers with numeric patterns either need not be removed from the telephone number database 120 or the computing device 125 may be configured to identify patterns in telephone numbers stored in other databases such as the patterned number database 130 or the normal number database 135.

Decision block 225 includes determining whether the digits in one of the telephone numbers in, for instance, the telephone number database 120 form an alphabetic pattern. In particular, the computing device 125 may make this determination using the process 300 described below and illustrated in FIG. 3. If the computing device 125 determines that the number includes an alphabetic pattern, the process 200 may continue with block 230. If not, the process 200 may continue with block 240.

Block 230 includes designating the telephone numbers with alphabetic patterns as patterned numbers. In one exemplary approach, the computing device 125 may designate the telephone number as having the alphabetic pattern so that the number may be identified, for instance, in a query for telephone numbers with alphabetic patterns performed by the sales terminal 140. As previously discussed, the alphabetic pattern may include any pattern formed by various combinations of letters alone or letters and numbers. The alphabetic pattern may be further or alternatively defined by a reference list such as a dictionary, a thesaurus, a list of names or other proper nouns, a list of abbreviations, a list of slang terms, a list of Internet vernacular terms (e.g., "leet speak"), etc. Moreover, the computing device 125 may remove any words included in the exclusion list from the reference lists or remove the alphabetic pattern designation if the number includes a word listed in the exclusion list.

Block 235 includes removing the telephone numbers with alphabetic patterns from the telephone number database 120. For example, the computing device 125 may remove the telephone numbers with alphabetic patterns from the telephone number database 120 and store those telephone numbers in the patterned number database 130.

Decision block 240 includes determining whether more numbers in the telephone number database 120 need to be checked for either a numeric or alphabetic pattern or both. If so, the process 200 returns to block 210. If not, the process 200 may continue with block 245.

Block 245 includes designating the remaining numbers in the telephone number database 120 as normal telephone numbers. For instance, the computing device 125 may designate the remaining numbers as normal telephone numbers and store the normal telephone numbers in the normal number database 135. Additionally, the computing device 125 may designate any number with a pattern that forms a word on the exclusion list as a normal number and store that number in the normal number database 135.

The process 200 may end after block 245.

Figure 3:
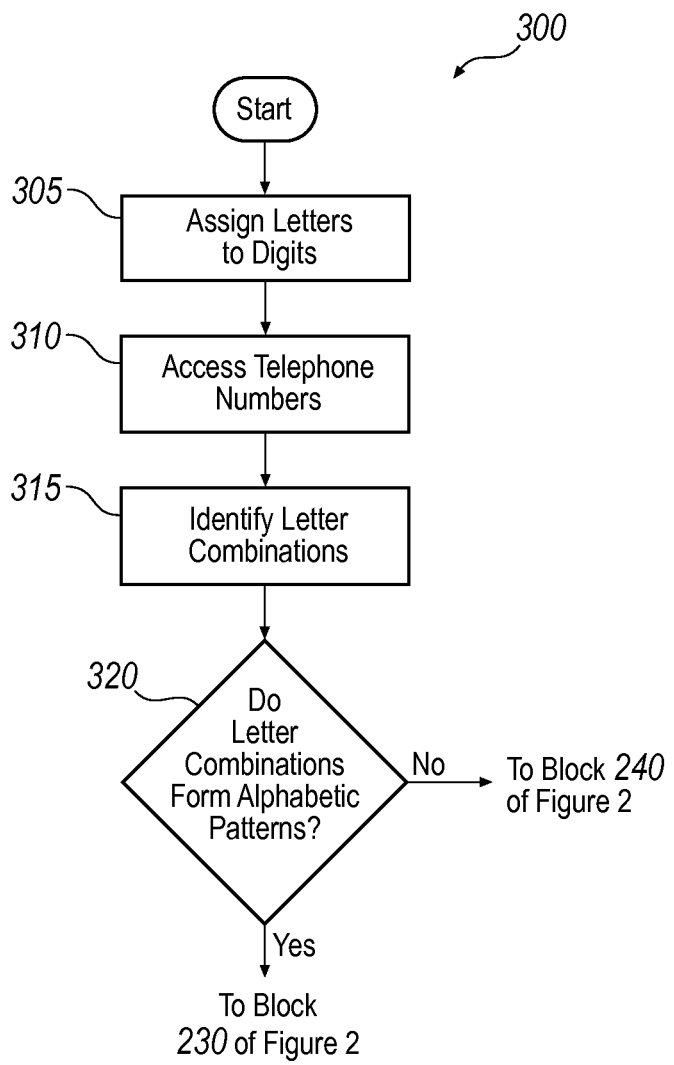
FIG. 3 illustrates an exemplary process of determining whether digits in a telephone number form an alphabetic pattern.

FIG. 3 is an exemplary flowchart of a process 300 for determining whether the digits in a telephone number form an alphabetic pattern. For instance, the process 300 may be performed by the computing device 125 at block 225 of the process 200 illustrated in FIG. 2. Of course, the process 300 is merely exemplary and the computing device 125 may perform other processes in addition to or instead of the process 300 as described herein.

Block 305 includes assigning letters to digits. For example, the computing device 125 may assign letters to digits based on the E.161 standard or any other standard. The E.161 standard associates each letter in the English alphabet to the 12 digits of a numeric keypad that may be found on a telephone. The computing device 125 need not assign letters to digits each time the process 300 is performed. In one exemplary implementation, the computing device 125 only assigns letters to each digit once and uses the same assignment for each telephone number in the telephone number database 120.

Block 310 includes accessing the telephone numbers stored in the telephone number database 120.

Block 315 may include identifying letter combinations formed by at least two digits of each of the telephone numbers stored in the telephone number database 120. For instance, the computing device 125 may apply the standard that associates letters in the alphabet to each digit and determine one or more letter combinations formed from some or all of the digits in the telephone number. In one exemplary approach, the computing device 125 may determine each letter combination formed by the last four digits of the telephone numbers in the telephone number database 120.

Decision block 320 includes determining whether the letter combinations form an alphabetic pattern. The computing device 125 may search for repeated letters, groups of double letters, sequential ascending letters as defined by an alphabet, sequential descending letters as defined by an alphabet, at least three occurrences of the same letter in a row, repetitive combinations of letters, mirrored letters, etc. within a single telephone number and identify such occurrences as an alphabetic pattern. Moreover, the alphabetic pattern may be based on words found in a reference list such as a dictionary, a thesaurus, a list of names or other proper nouns, a list of abbreviations, a list of slang terms, a list of Internet vernacular terms (e.g., "leet speak"), etc. Thus, the computing device 125 may compare the letter combination to the reference list to determine whether the letter combination forms a word. If the computing device 125 determines that the telephone number includes an alphabetic pattern, the process 300 may continue with block 230 of FIG. 2. If no alphabetic pattern is discovered, the process 300 may continue with block 240 of FIG. 2.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A method comprising:
   storing telephone numbers in a telephone number database;
   identifying and designating as patterned telephone numbers those of the telephone numbers that have digits that occur in any of numeric patterns defined by a first reference list;
   identifying and designating as patterned telephone numbers those of the telephone numbers that have digits that occur in any of alphanumeric patterns defined by a second reference list, each of the alphanumeric patterns including alphabetic letters or mixed alphabetic letters and numbers;
   assigning a weight to each of the patterned telephone numbers, wherein a greater weight is assigned to patterned telephone numbers that have digits that occur both in any of the numeric patterns and in any of the alphanumeric patterns than to patterned telephone numbers that have digits that occur in only one of any of the numeric patterns or any of the alphanumeric patterns; and
   designating, by a computing device, any remaining telephone numbers in the telephone number database as normal telephone numbers.

2. A method as set forth in claim 1, further comprising removing the telephone numbers designated as patterned telephone numbers from the telephone number database and storing the removed telephone numbers in a patterned number database.

3. A method as set forth in claim 1, wherein identifying those of the telephone numbers that have digits that occur in any of the alphanumeric patterns defined by the second reference list includes:
   assigning at least one letter in an alphabet to a first digit;
   assigning at least one other letter in an alphabet to a second digit;
   identifying a letter combination created by at least two of the digits of the telephone number; and
   determining whether the letter combination is included in the second reference list as an alphanumeric pattern.

4. A method as set forth in claim 3, wherein determining whether the letter combination is included in the reference list as an alphanumeric pattern includes:
   comparing the letter combination to words included in the reference list; and
   matching the letter combination to at least one word in the reference list.

5. A method as set forth in claim 3, further comprising:
   designating the telephone number as the patterned telephone number if the letter combination forms any of the alphanumeric patterns.

6. A method as set forth in claim 3, wherein determining whether the letter combination is included in the second reference list as an alphanumeric pattern includes:
   searching the letter combination for repeating letters; and
   designating the telephone number as the patterned number if the letter combination includes repeating letters.

7. A method as set forth in claim 3, wherein determining whether the letter combination is included in the second reference list as an alphanumeric pattern includes:
   searching the letter combination for sequential letters as defined by the alphabet; and
   designating the telephone number as the patterned number if the letter combination includes sequential letters.

8. A method as set forth in claim 3, wherein identifying a letter combination created by the digits in the telephone number is further defined as identifying a letter combination created by the last four digits of the telephone number.

9. A method comprising:
   assigning at least one letter in an alphabet to a first digit;
   assigning at least one other letter in an alphabet to a second digit;
   accessing a telephone number database storing telephone numbers, each telephone number having a plurality of digits;
   identifying respective letter combinations created by at least two digits of the respective telephone numbers in the telephone number database;
   determining whether each of the telephone numbers has digits that occur in any of numeric patterns defined by a first reference list;
   determining whether the letter combination of each of the telephone numbers forms any of alphanumeric patterns defined by a second reference list, each of the alphanumeric patterns including alphabetic letters or mixed alphabetic letters and numbers;
   designating those of the telephone numbers that have digits that occur in any of the numeric patterns or whose letter combination forms any of the alphanumeric patterns as patterned telephone numbers;
   assigning a weight to each of the patterned telephone numbers, wherein a greater weight is assigned to patterned telephone numbers that have digits that occur both in any of the numeric patterns and in any of the alphanumeric patterns than to patterned telephone numbers that have digits that occur in only one of any of the numeric patterns and any of the alphanumeric patterns; and
   designating, by a computing device, the telephone number as a normal number if the telephone number is not designated as one of the patterned telephone numbers.

10. A method as set forth in claim 9, wherein determining whether the letter combination forms any of the alphanumeric patterns includes:
    comparing the letter combination to words included in the second reference list; and
    matching the letter combination to at least one word in the second reference list.

11. A method as set forth in claim 9, wherein determining whether the letter combination forms any of the alphanumeric patterns includes:
    searching the letter combination for repeating letters; and
    designating the telephone number as the patterned number if the letter combination includes repeating letters.

12. A method as set forth in claim 9, wherein determining whether the letter combination forms any of the alphanumeric patterns includes:
    searching the letter combination for sequential letters as defined by the alphabet; and
    designating the telephone number as the patterned number if the letter combination includes sequential letters.

13. A method as set forth in claim 9, wherein identifying a letter combination created by the digits in the telephone number is further defined as identifying a letter combination created by the last four digits of the telephone number.

14. A system comprising:
    a telephone number database storing a plurality of telephone numbers, each having a plurality of digits; and
    a computing device configured to access the telephone number database, identify and designate as patterned telephone numbers those of the telephone numbers that have digits that occur in any of numeric patterns defined by a first reference list, identify and designate as patterned telephone numbers those of the telephone numbers that have digits that occur in any of alphanumeric patterns defined by a second reference list, each of the alphanumeric patterns including alphabetic letters or mixed alphabetic letters and numbers, and designate any remaining telephone numbers as normal numbers in the telephone number database, wherein the computing device is configured to assign a weight to each patterned telephone number based on the number of alphabetic or alphanumeric patterns identified such that a greater weight is assigned to patterned telephone numbers that have digits that occur both in any of the numeric patterns and in any of the alphanumeric patterns than to patterned telephone numbers that have digits that occur in only one of any of the numeric patterns or any of the alphanumeric patterns.

15. A system as set forth in claim 14, wherein the computing device is further configured to:

identify a letter combination created by at least two of the digits of the telephone number; and determine whether the letter combination forms any of the alphabetic patterns.

16. A system as set forth in claim 15, wherein the computing device is further configured to:

designate the telephone number as the patterned number if the letter combination forms any of the alphabetic patterns.

17. A system as set forth in claim 15, wherein the computing device is configured to identify the letter combination created by the last four digits of the telephone number.

18. A system as set forth in claim 14, wherein the computing device is configured to interpret at least one digit as at least one letter based at least in part on visual similarities between the at least one digit and the at least one letter.

19. A system as set forth in claim 14, wherein the computing device is configured to apply an exclusion list to the reference list prior to identifying the alphabetic pattern.

* * * * *